United States Patent Office 2,978,263
Patented Apr. 4, 1961

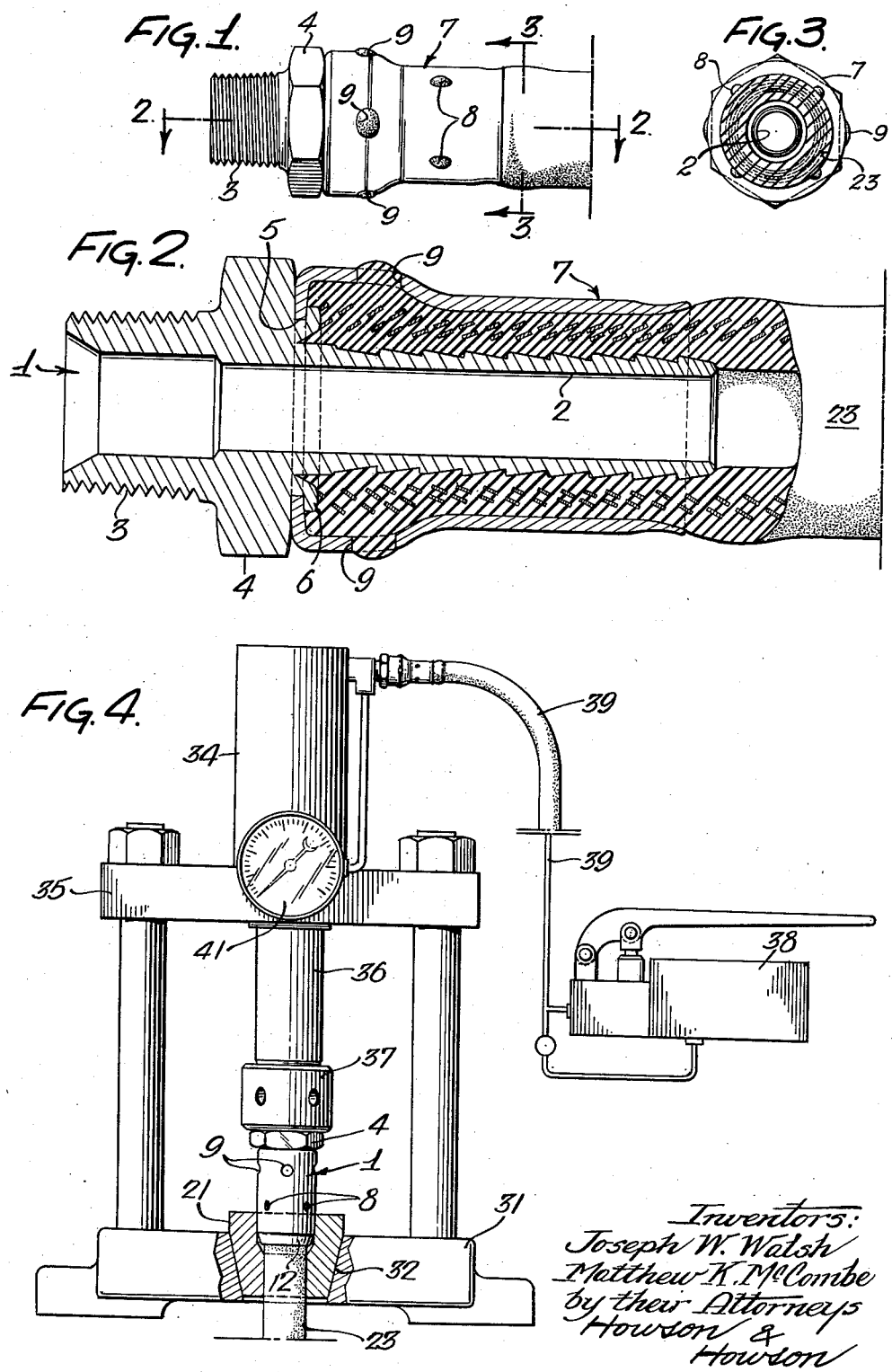

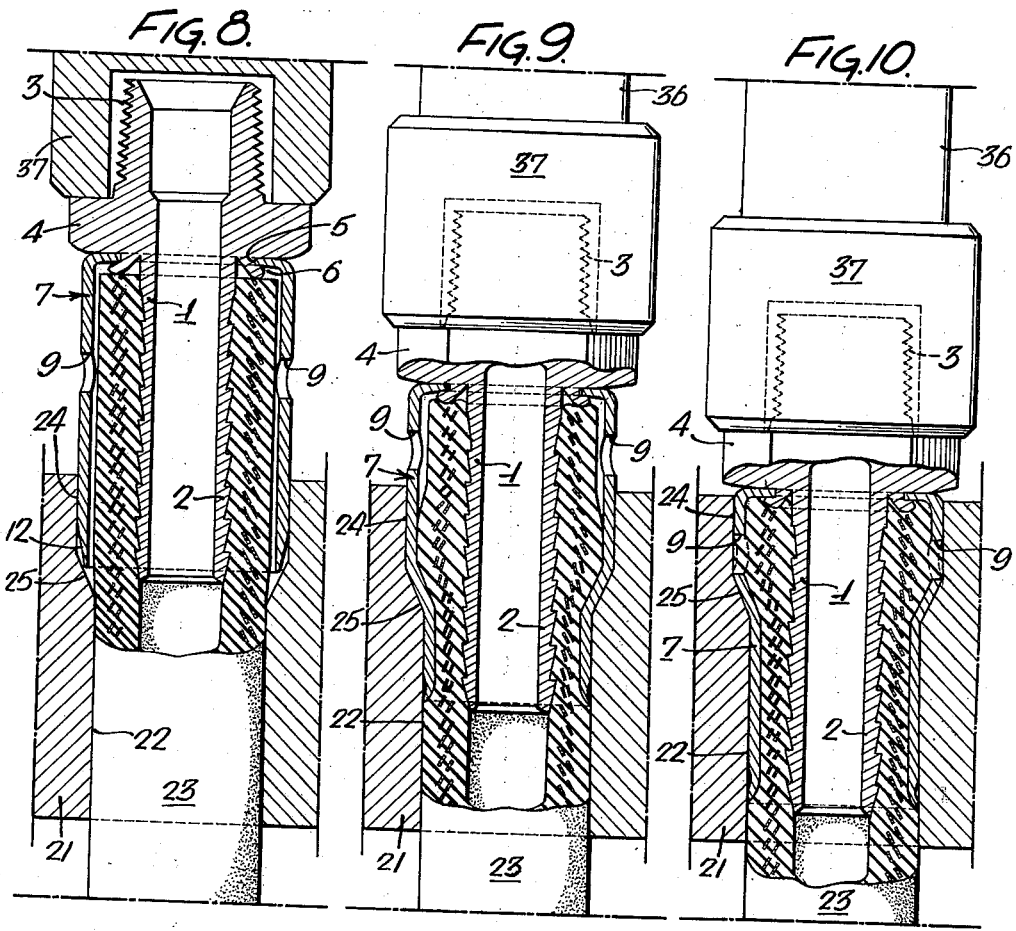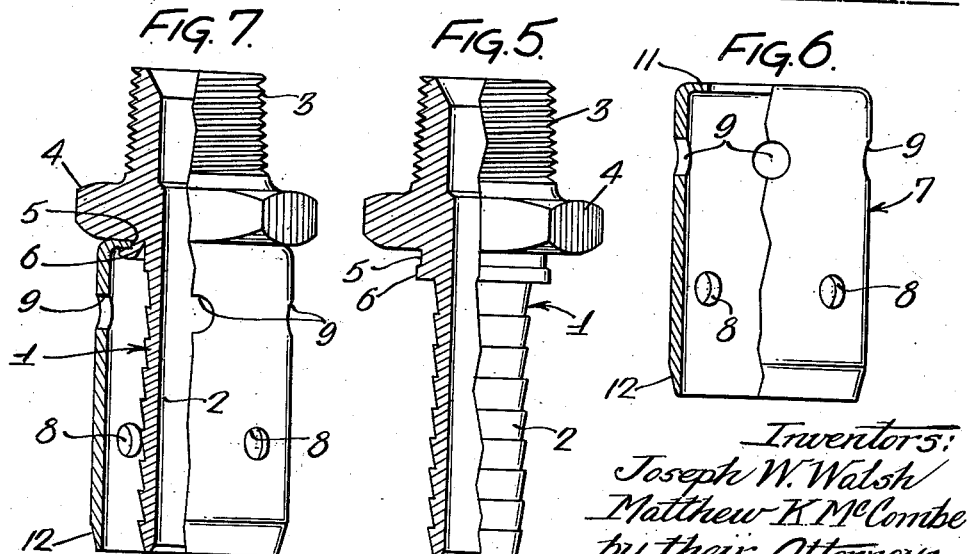

2,978,263
HOSE COUPLING HAVING DEFORMABLE SLEEVE WITH EXTRUSION HOLES

Joseph W. Walsh, Rosemont, and Matthew K. McCombe, Willow Grove, Pa., assignors to Mulconroy Company, Philadelphia, Pa., a corporation of Pennsylvania Filed Jan. 11, 1954, Ser. No. 403,104

1 Claim. (Cl. 285—256)

This invention relates to hose couplings, and a principal object of the invention is to provide an improved coupling applicable to all types of hose wherein the structure is such that the wall, or a material part of said wall, while relatively resistant to compression is still sufficiently flexible to afford a substantial degree of moldability or change in form without destructive action.

The invention, therefore, has particular significance with respect to hose employing rubber, plastic and like materials of a resilient or flexible nature which are also substantially non-compressible.

One object of the invention is to provide a coupling for hose of the stated character, and in particular for hose of the types used in refrigeration systems to conduct refrigerating media, such as Freon, in power steering devices, and in other applications where leak-proof characteristics are essential, that will fully meet this latter requirement.

Another object is to provide a coupling for hydraulic hose of the type wherein the carcass comprises interior metallic or other reinforcing elements, which may be attached directly to the outer rubber or other sheath of the hose entirely independently of the said reinforcing elements and which when so attached will become in effect an integral nondisplaceable and leak-proof part of the hose structure.

Another object of the invention is to provide a coupling which utilizes the outer resilient or flexible portions of the hose as a medium for anchoring the coupling to the hose body in a manner precluding inadvertent separation of the coupling from the hose structure.

Still another object is to provide a coupling for hydraulic hose which may be applied to the hose by relatively simple and inexpensive process to produce an integral, extremely strong, and leak-proof assembly.

The invention contemplates also a novel method for attaching the elements of a hose coupling to the body of the hose in a manner precluding separation of the coupling parts from the hose by any normal operating strain.

The invention will be more readily understood by reference to the attached drawings wherein:

Fig. 1 is side view of a hose end including a coupling member made and attached in accordance with the invention;

Fig. 2 is an enlarged sectional view on the line 2—2, Fig. 1;

Fig. 3 is a sectional view on the line 3—3, Fig. 1;

Fig. 4 is an elevational view partly in section of a machine for applying the coupling to a hose end;

Fig. 5 is a side view partly in section of one element of the coupling;

Fig. 6 is a side view partly in section of another element of the coupling;

Fig. 7 is a side view partly in section showing the two elements shown in Figs. 5 and 6 respectively united prior to attachment of the coupling member to the hose end, and;

Figs. 8, 9 and 10 are longitudinal sectional views illustrating three successive steps in the process of attaching the coupling to a hose end.

With reference to the drawings, and more particularly to Figs. 5 and 6, a coupling made in accordance with the invention may comprise an inner nipple element 1 which in the present instance includes an externally serrated stem 2, said stem in assembly occupying a position in the interior of the hose, the nipple element comprising also an externally threaded terminal portion 3 and, intermediate this portion and the stem 2, a hexagonal-nut-like body portion 4. Immediately adjoining the body portion 4, at the side thereof which adjoins the stem 2, is a circumferential recess 5 and an adjoining flange 6, the function of which will be hereinafter described.

The coupling member also comprises a ferrule 7, shown in Fig. 6, which in assembly embraces the stem 2 and which may comprise one or a plurality of apertures, the apertures, in the present instance, being arranged in two circumferential series, 8 and 9 respectively, which adjoin the respective opposite ends of the ferrule. At one end the ferrule has an inturned flange 11 the inner diameter of which is slightly larger than the diameter of the flange 6 of the nipple 1, and the function of this flange 11 will be described below. At the opposite end the ferrule has an external taper 12, for a purpose also hereinafter described.

Fig. 7 shows the nipple 1 and ferrule 7 in subassembled relation. In the present instance the ferrule is secured to the nipple by first inserting the stem 2 into the latter so that the flange 11 of the ferrule lies opposite the annular recess 5 and by then upsetting the flange 6 by means of a suitable die passed into the open end of the ferrule and between the ferrule and the stem 2, the upset flange being shown in Fig. 7. While this constitutes a simple and effective means for joining the nipple and ferrule together, it will be apparent that the union of these parts may be accomplished by other means, such for example as welding, without departure from the invention, and that in some instances, when used, for example, with certain types of low pressure hose, the two coupling parts may be applied to the hose without other interconnection with each other than that provided by their mutual clamping engagement with the hose body.

The hose coupling illustrated in the drawings as an embodiment of the invention is adapted for application to the hose end by insertion of the stem 2 into the interior of the hose so that the end of the hose which embraces the stem will occupy the space between the stem and the ferrule. This is most clearly illustrated in Fig. 8. It will be noted therein that the outside diameter of the stem 2 of the nipple is somewhat greater than the inside diameter of the hose so that the body of the hose will be slightly expanded by the nipple when the latter is inserted. The inside diameter of the ferrule 7 should then be such as to freely admit the expanded end of the hose, and preferably an actual clearance space will exist between the hose body and the ferrule. For hydraulic hose having a wire-braid internally reinforced wall and a normally thick rubber cover of say 1/16", for example, an all around clearance in the neighborhood of 1/32" will be found satisfactory. Thereafter, and in accordance with the invention, the inner end portion of the ferrule is contracted radially, as hereinafter described, so that the ferrule will assume the contracted form illustrated, for example, in Fig. 2 wherein the coupling is shown in its final attached relation to the hose body. It will be noted particularly that contraction of the inner end portion of the ferrule also radially contracts the corresponding portion of the hose body and by compression between the ferrule and the stem displaces the resilient or flexible material of the hose toward the terminal end of the said body and into the relatively large outer uncontracted end portion of the ferrule. Portions of the displaced material, particularly if the ferrule cavity has been completely filled with the material of the hose body will tend to move outwardly through the apertures 9 of the ferrule or at least to enter the apertures and in some instances may project appreciably beyond the outer surface of the ferrule. Similarly, as illustrated in the Figs. 1 and 3, the material of the hose body has been pressed outwardly into the apertures 8 which lie in the contracted inner portion of the ferrule so that here also the said material may project appreciably beyond the outer surface of the ferrule. By reason of the interlocking relationship between the elements of the coupling and the hose body which results from the aforesaid displacement of the latter into the cavity of the ferrule, the coupling is attached to the hose body in a manner highly resistant to separation even by heavy direct tensional strains longitudinally of the hose. It will be apparent that the portion of the hose body which occupies the relatively large outer end of the ferrule and which is completely confined except for any portions thereof which may extend into and through the apertures 9, acts to preclude retraction of the hose end from the relatively narrow space between the radially contracted portion of the ferrule and the stem.

The manner in which the ferrule 7 is contracted forms an important part of the invention and is well illustrated in Figs. 4 and 8 to 10 inclusive. This operation is performed through the medium of a die 21 having a minor bore 22 which corresponds closely in diameter to the outside diameter of the hose body 23. The die also has a major bore 24 which is slightly larger than the normal outside diameter of the ferrule 7. The bores 22 and 24 are connected by an inclined bore section 25 having an angle which corresponds more or less closely to the angle of the bevel 12 at the inner end of the ferrule. The die 21 is preferably split to facilitate insertion of the hose body after the coupling member has been inserted in and over the end of the latter, as best illustrated in Fig. 8. From this position pressure applied to the coupling or to the die or to both effects a relative axial movement which brings the end of the ferrule into the minor bore 22 of the die in the manner illustrated in Figure 9 so as to radially contract the ferrule upon the hose body. As this movement progresses toward the outer end of the ferrule the material of the hose body is displaced longitudinally, the effect being to expand the terminal end of the hose body and to cause the material to fill the inner end of the space between the ferrule and the stem. Continued movement will eventually bring the die and coupling to the relative positions shown in Fig. 10 and in this position the material of the hose will in the illustrated embodiment have extended outwardly in the apertures 8 and 9 to the extent permitted by the confronting surfaces of the die. When the die is withdrawn the resilient material of the hose will readjust to the condition shown in Figs. 1, 2 and 3.

The apertures 9 in this case not only function with the apertures 8 to augment the anchoring together of the coupling member and the hose body, but function also in certain types of hose as a visual means for determining whether or not the material of the hose displaced by the progressive contraction of the ferrule has adequately filled the cavity between the coupling elements. If the material completely fills or projects beyond the outer ends of the apertures 9 it may be assumed that the desired result has been obtained. If on the other hand the apertures 9 are not filled, that fact may constitute an indication that the material of the hose body has not adequately filled the cavity. In such case the desired effect may be obtained by repeating the operation with a somewhat smaller die. A more universal and positive means for gauging the effectiveness of the union between the coupling and hose will be described below.

It will be noted that the taper 12 at the end of the ferrule functions to the end that the radial contraction of the ferrule into the hose body will not force the end of the ferrule into the hose body to an extent resulting in possible injury to the latter, this by reason of the fact that the action of the die causes in effect a reversal of the bevel from the outside to the inside of the ferrule as best illustrated in Fig. 2.

The foregoing process may be accomplished through the medium of a simple type of hydraulic press illustrated in Fig. 4. This consists of a platen 31 which is apertured at 32 for reception of the split die 21 described above. Preferably the aperture 32 of the platen will have an opening to the side of the platen sufficiently wide to admit the hose body. The press further includes a hydraulic cylinder 34 which is supported in the upper portion 35 of the press and which contains the usual plunger 36. This plunger carries at its lower end a head 37 which is recessed for reception of the threaded terminal portion 3 of the coupling so that the pressure of the plunger may be applied to the outer face of the body portion 4 of the coupling member. With the coupling in place upon the hose body, as illustrated in Fig. 8, hydraulic pressure may be applied to the outer end of the cylinder by way of a suitable pump 38 and pipe 39 to force the plunger 36 downwardly and to thereby drive the coupling downwardly into and through the die 21. A pressure gage 41 is provided to indicate the hydraulic pressure applied in the assembly operation described above, and for any given size and character of assembly the ultimate hydraulic pressure required may readily be determined and will then constitute an accurate index as to whether or not effective union has been created between the coupling and the hose. Since the use of apertures, such as 8 and 9, in the ferrule are not essential to the production of an effective union in accordance with the principle of the invention and the apertures may therefore be eliminated if desired together with their indicating function described above, the positive and accurate indication afforded by the gage 41 constitutes a highly desirable element of the apparatus.

We claim:

In a coupling for hose of non-compressible flexible material such as rubber, a tubular fitting, a nipple integrally connected with the fitting and extending into an open end of the hose, and a ferrule embracing the nipple and rigidly anchored to the fitting, said ferrule and nipple forming between them an annular space closed at its inner end and containing the hose end, the said space between the nipple and the ferrule occupied by the hose end being materially smaller radially within an area relatively remote to the inner end thereof than the normal thickness of the hose body and subjecting the latter to material radial contraction, and an adjoining longitudinal portion of said space at the inner end of the socket being materially larger radially than the normal thickness of the hose body and forming a chamber for the terminal end of the hose into which the non-compressible hose material is displaced axially by said radial contraction, said chamber having an internal cubical capacity materially less than the total volume of the non-compressible hose material so displaced and having at least one radial aperture in the wall thereof affording free outward flow for the excess of said displaced material from the chamber, the material in the chamber and projecting through the aperture constituting substantially all of the material displaced by said contraction.

References Cited in the file of this patent

UNITED STATES PATENTS

Re. 19,865    Eastman               Feb. 25, 1936
591,468      Gold                   Oct. 12, 1897

(Other references on following page)

UNITED STATES PATENTS

| | | |
|---|---|---|
| 1,928,836 | Loughead | Oct. 3, 1933 |
| 2,054,362 | Cowles | Sept. 15, 1936 |
| 2,216,686 | Fentress | Oct. 1, 1940 |
| 2,321,991 | Butler | June 15, 1940 |
| 2,310,250 | Melsom | Feb. 9, 1943 |
| 2,310,536 | Melsom | Feb. 9, 1943 |
| 2,430,921 | Edelmann | Nov. 18, 1947 |
| 2,453,997 | MacWilliam | Nov. 16, 1948 |
| 2,560,565 | Freeman | July 17, 1951 |
| 2,631,047 | Spender | Mar. 10, 1953 |
| 2,686,066 | Paquin | Aug. 10, 1954 |
| 2,768,009 | Currie | Oct. 23, 1956 |
| 2,810,594 | Walsh | Oct. 27, 1957 |
| 2,812,959 | Fuller | Nov. 12, 1957 |

FOREIGN PATENTS

| | | |
|---|---|---|
| 142,172 | Australia | July 12, 1951 |